United States Patent
Surya Prakash et al.

(10) Patent No.: US 12,539,925 B2
(45) Date of Patent: Feb. 3, 2026

(54) MODULAR BALANCING SYSTEMS FOR VEHICLES

(71) Applicant: Deere & Company, Moline, IL (US)

(72) Inventors: Haris T. Surya Prakash, Pune (IN); Basker Balaji Pk, Pune (IN); Michael R. Dorman, Dubuque, IA (US); Dustin T. Staade, Dubuque, IA (US); Doug M. Lehmann, Durango, IA (US); Brent M. Hunold, Asbury, IA (US); Giovanni A. Wuisan, Epworth, IA (US); Justin C. Gross, Dubuque, IA (US); Scott R. Stahle, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/771,282

(22) Filed: Jul. 12, 2024

(65) Prior Publication Data

US 2026/0015049 A1 Jan. 15, 2026

(51) Int. Cl.
*B62D 37/04* (2006.01)

(52) U.S. Cl.
CPC .................................. *B62D 37/04* (2013.01)

(58) Field of Classification Search
CPC ... B62D 37/04; B62D 49/085; B62D 49/0628
See application file for complete search history.

(56) References Cited

U.S. PATENT DOCUMENTS

| 4,580,811 A * | 4/1986 | Wykhuis | B62D 49/085 |
| | | | 280/759 |
| 6,283,527 B1 * | 9/2001 | Desmarais | B60P 1/00 |
| | | | 280/759 |
| 10,167,027 B2 * | 1/2019 | Perron | B62D 49/0621 |
| 10,392,056 B2 | 8/2019 | Perron et al. | |

FOREIGN PATENT DOCUMENTS

| GB | 2544407 A * | 5/2017 | ............ B60R 19/48 |
| JP | H11286250 A * | 10/1999 | |

* cited by examiner

*Primary Examiner* — Faye M Fleming

(57) ABSTRACT

A modular balancing system includes one or more modular weights and a holding structure, where the holding structure includes one or more cavities configured to receive and hold the one or more modular weights, and the holding structure is configured to be coupled to the vehicle.

20 Claims, 16 Drawing Sheets

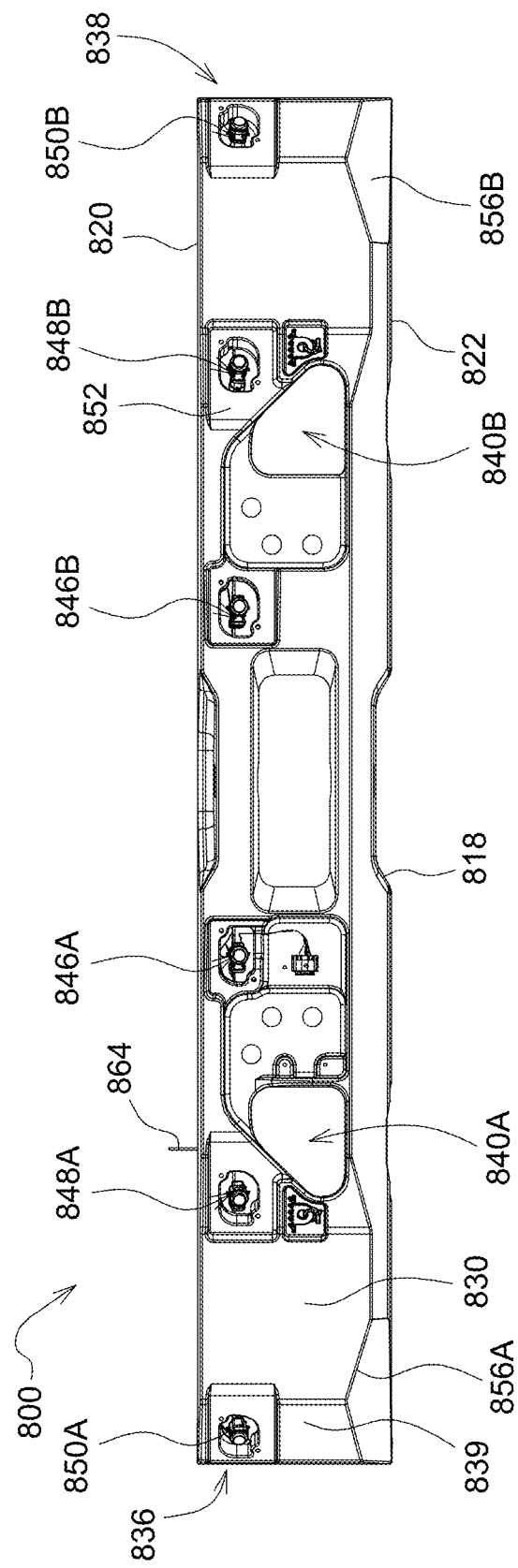

MODULAR BALANCING SYSTEMS FOR VEHICLES

FIELD OF THE DISCLOSURE

Example embodiments relate to modular systems that help to provide balance and stability for heavy equipment applications (including, for example, construction applications).

BACKGROUND

Various mechanisms and components are often required in heavy equipment applications to provide stability and balance throughout a variety of different tasks performed by the heavy equipment applications.

SUMMARY

In various aspects, the present disclosure relates to a modular balancing system for a vehicle.

In at least one example embodiment, the modular balancing system may include one or more modular weights and a holding structure, where the holding structure includes one or more cavities configured to receive and hold the one or more modular weights, and the holding structure is configured to be coupled to the vehicle.

In at least one example embodiment, the holding structure may be configured to be coupled to a frame structure of the vehicle.

In at least one example embodiment, the holding structure may include one or more first apertures that receive or allow access to one or more components of the frame structure of the vehicle.

In at least one example embodiment, at least one of the one or more first aperture may include one or more blended wall features.

In at least one example embodiment, the one or more first apertures may extend through the one or more cavities.

In at least one example embodiment, each of the one or more modular weights may include one or more grooves that correspond with the one or more first apertures of the holding structure to allow access to the one or more components of the frame structure of the vehicle.

In at least one example embodiment, the modular balancing system may further include a weight plate disposed between the holding structure and the vehicle.

In at least one example embodiment, the weight plate may include one or more second apertures that correspond with the one or more first apertures of the holding structure and the one or more groove of the one or more modular weights to allow access to the one or more components of the frame structure of the vehicle.

In at least one example embodiment, each of the one or more cavities may include one or more projections, and each of the one or more weights may include one or more grooves that correspond with the one or more projections, where the one or more projections and one or more grooves help to align the one or more weights within the one or more cavities.

In at least one example embodiment, the holding structure may include one or more first holes configured to receive one or more first couplers for coupling the holding structure to the vehicle.

In at least one example embodiment, the one or more first holes may extend through the one or more cavities, and each of the one or more weights may include one or more second holes that correspond with the one or more first holes, where the one or more first couplers extend through the holding structure and the one or more weights to couple the holding structure and the one or more weights to the vehicle.

In at least one example embodiment, the modular balancing system may further include a weight plate disposed between the holding structure and the vehicle.

In at least one example embodiment, the weight plate may include one or more third holes configured to receive one or more second couplers for coupling the weight plate to the vehicle.

In at least one example embodiment, the holding structure may include opposing first and second outer regions and a first middle region disposed therebetween, In at least one example embodiment, the first and second outer regions have a first height, and the middle region has a second height that is less than the first height.

In at least one example embodiment, the holding structure may include opposing first and second surfaces, where at least one of the first and second surfaces includes first and second sloped portions.

In at least one example embodiment, the first sloped portion may transition between the first outer region and the first middle region, and the second sloped portion may transition between the second outer region and the first middle region.

In at least one example embodiment, the holding structure may include opposing third and fourth outer regions and a second middle region disposed therebetween.

In at least one example embodiment, the third and fourth outer regions may have a first depth, and the middle region may have a second depth that is greater than the first depth.

In at least one example embodiment, the holding structure may include opposing third and fourth surfaces.

In at least one example embodiment, the third surface may include third and fourth sloped portions.

In at least one example embodiment, the third sloped portion may transition between the third outer region and the second middle region.

In at least one example embodiment, the fourth sloped portion may transition between the fourth outer region and the second middle region.

In at least one example embodiment, the fourth surface may be configured to be disposed immediately adjacent to the vehicle.

In at least one example embodiment, the fourth surface may be substantially flat.

In at least one example embodiment, the fourth surface may include a channel configured to receive one or more wiring assemblies.

In at least one example embodiment, the channel may extend along greater than or equal to about 70% of a total length of the holding structure.

In at least one example embodiment, the channel may include one or more openings in the holding structure that extend from the third surface to the fourth surface to aid during the placement of the one or more wiring assemblies.

In at least one example embodiment, the holding structure may include opposing first and second ends.

In at least one example embodiment, the first end may include a fifth sloped portion that transitions from the third surface towards the fourth surface.

In at least one example embodiment, the second end may include a sixth sloped portion that transitions from the third surface towards the fourth surface.

In at least one example embodiment, the holding structure may include a first chamfered surface at or near the first end of the holding structure and a second chamfered surface at or near the second end of the holding structure.

In at least one example embodiment, the first chamfered surface may at least partially extend along the third outer region and the fifth sloped portion.

In at least one example embodiment, the second chamfered surface may at least partially extend along the fourth outer region and the sixth sloped portion.

In at least one example embodiment, the one or more modular weights may include a first modular weight and a second modular weight.

In at least one example embodiment, the one or more cavities may include a first cavity configured to receive and hold the first modular weight and a second cavity configured to receive and hold the second modular weight.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For the purposes of clarity, various dimensions of the drawings may have been exaggerated.

FIG. 9B is a front view of the example hitch structure illustrated in FIG. 7 including a wiring or sensor harness or assembly;

DETAILED DESCRIPTION

Figure 1A:
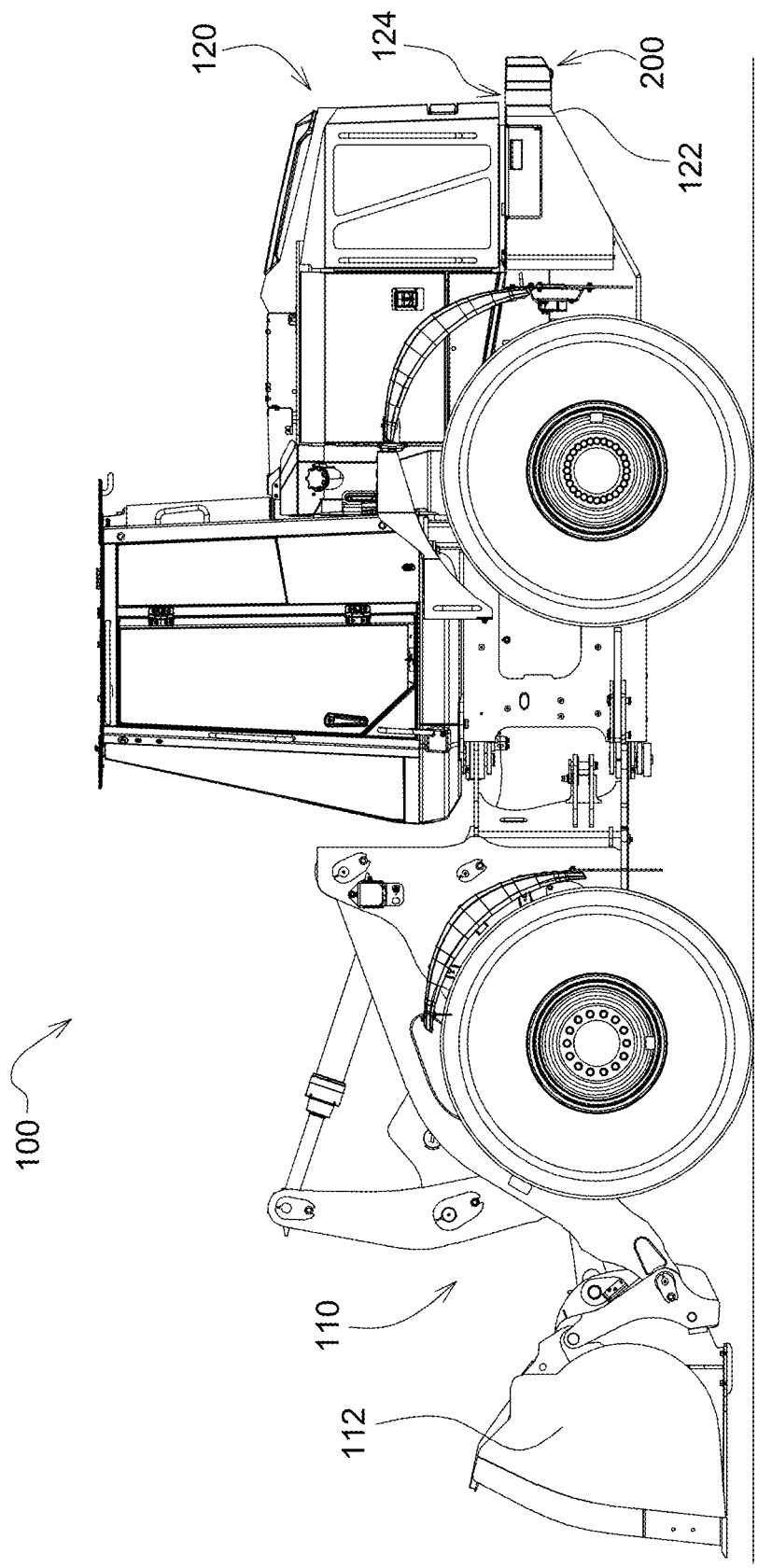
FIG. 1A is a sideview of an example vehicle having an example modular balancing system in accordance with at least one example embodiment of the present disclosure.

Some detailed example embodiments are disclosed herein. However, specific structural and functional details disclosed herein are merely representative for the purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

At least some example embodiments of the present disclosure provide modular balancing systems for heavy equipment applications. The modular balancing systems allow for the attachment and detachments of dead weights to help provide balance and stability to mechanical systems of the heavy equipment applications. The modular balancing system may also help to improve the machine length and/or departure angle and/or machine styling and/or transport condition and/or costs of the heavy equipment applications.

Although front-end loaders are discussed herein as an example heavy equipment application, it should be appreciated that, in various other example embodiments, modular balancing systems may be similarly useful for other vehicles. The modular balancing system as detailed herein may be useful, for example, for mining vehicles and/or construction vehicles and/or utility vehicles. The modular balancing systems as detailed herein may be useful, for example, for backhoe loaders, tractors, bulldozers, forklifts, cranes, haul trucks, underground graders, rock breakers, and the like.

Figure 1B:
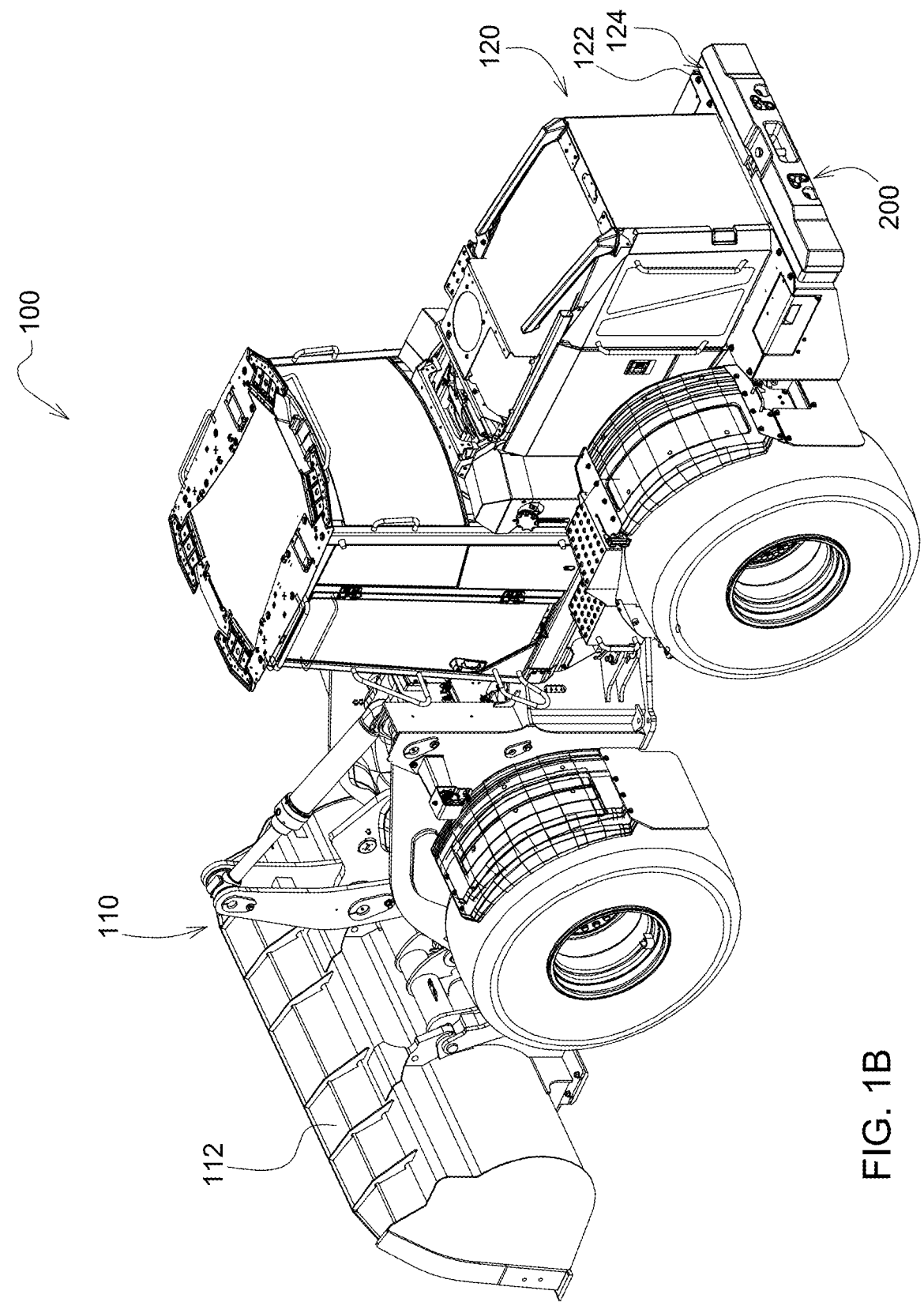
FIG. 1B is a rear, perspective view of the example vehicle illustrated in FIG. 1A.

FIG. 1A is a sideview of a vehicle 100 (e.g., front-end loader) including an example modular balancing system 200. FIG. 1B is a rear, perspective view of the vehicle 100 including the example modular balancing system 200. The vehicle 100 includes a front (or first) end 110 and an opposing rear (or second) end 120. In at least one example embodiment, the front end 110 may include a bucket 112. The rear end 120 includes the modular balancing system 200 secured to a (rear) frame structure (or member) 122 of the vehicle 100. In at least one example embodiment, a weight plate 124 may be disposed between the frame structure 122 and the modular balancing system 200. The modular balancing system 200 and the weight plate 124 are aligned with an external surface of the frame structure 122 and coupled to the frame structure 122. For example, the modular balancing system 200 and the weight plate 124 may be bolted to the frame structure 122. The modular balancing system 200 and the weight plate 124 may be readily secured to a variety of existing frame structures, in addition to the frame structure 122, using common hardware.

Figure 2:
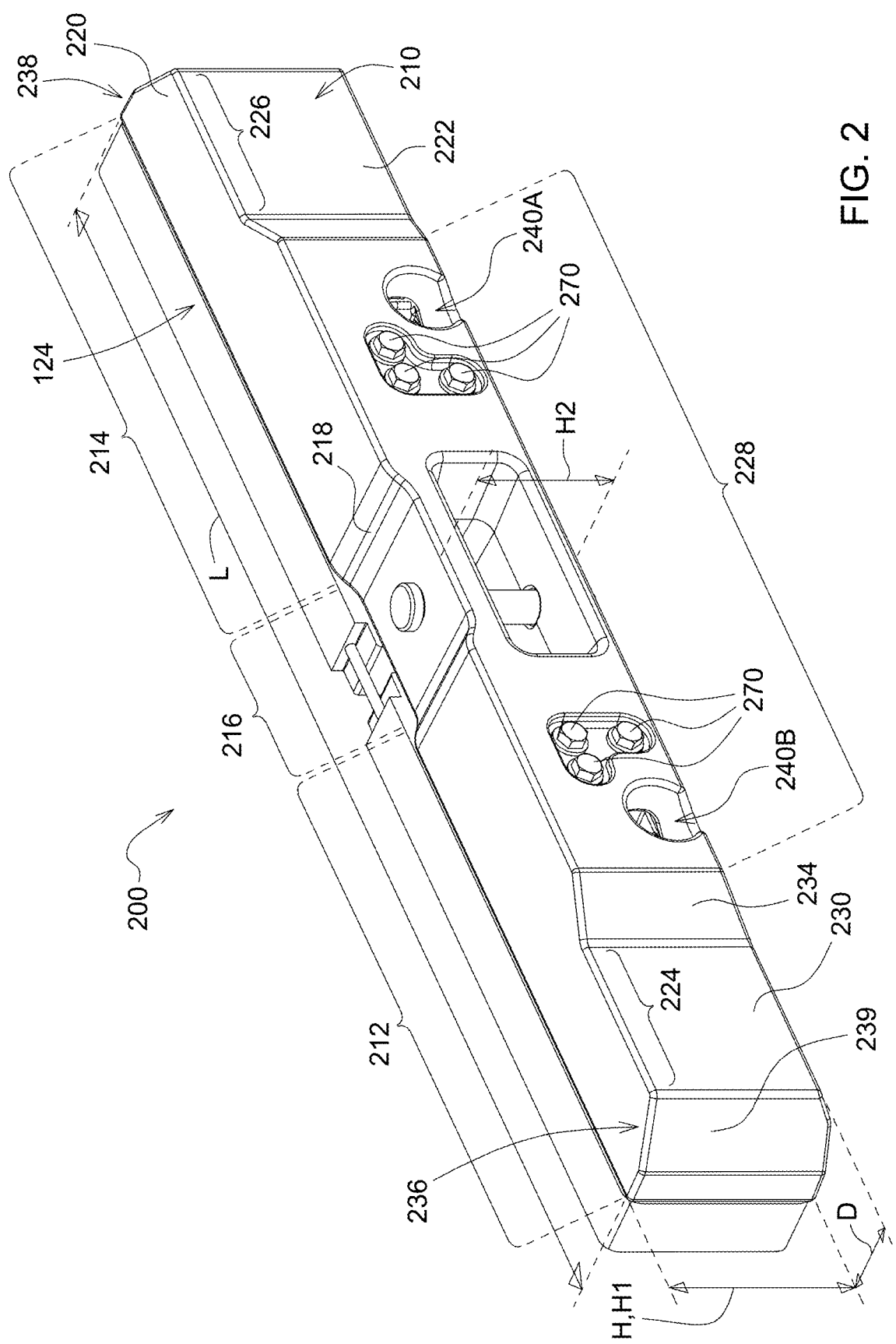
FIG. 2 is a front, perspective view of the modular balancing system illustrated in FIG. 1A.

FIG. 2 is a front, perspective view of the modular balancing system 200 and the weight plate 124 as aligned with the modular balancing system 200. The modular balancing system 200 includes a holding (or shell) structure (or member) 210. The holding structure 210 may have a general elongated shape corresponding, or compatible, with a variety of existing frame structures. For example, the holding structure 210 may have an average length (L) that is greater than an average height (H) of the holding structure 210. The weight plate 124 may have an elongated shape similar to the shape of the holding structure 210. For example, the weight plate 124 may have an average length (L2) that is greater than an average height (H3) of the weight plate 124. The weight plate 124, however, may have a substantially uniform depth and height. In at least one example embodiment, the average length (L2) of the weight plate 124 may be same as the average length (L) of the holding structure 210. In at least one example embodiment, the average height (H3) of the weight plate 124 may be the same as the average height (H) of the holding structure 210.

In at least one example embodiment, the holding structure 210 may have an average height (H) that is greater than or equal to about 17% to less than or equal to about 33% (e.g., is greater than or equal to about 25% to less than or equal to about 33%) of the average length (L). For example, the holding structure 210 may have a length (L) greater than or equal to about 602.5 millimeters to less than or equal to about 683.5 millimeters, and the holding structure 210 may have an average height greater than or equal to about 108.3 millimeters to less than or equal to about 225.6 millimeters (e.g., greater than or equal to about 157.6 millimeters to less than or equal to about 225.6 millimeters or greater than or equal to about 132.95 millimeters to less than or equal to about 212.6 millimeters).

The holding structure 210 may have opposing first and second outer regions (or portions or sections or ends) 212, 214 and a first middle region (or portions or sections) 216. The first and second outer regions 212, 214 may have a first height (H1), and the first middle region 216 may have a second height (H2) that is less than the first height (H1). In at least one example embodiment, the first height (H1) may be greater than or equal to about 157.6 millimeters to less than or equal to about 225.6 millimeters, and the second height (H2) may be greater than or equal to about 108.3 millimeters to less than or equal to about 199.68 millimeters.

The holding structure 210 has a top (or first) surface 220 and an opposing bottom (or second) surface 222. At least one of the top and bottom surfaces 220, 222 may include a sloped surface 218 that transitions the holding structure 210 from the first height (H1) to the second height (H2). In at least one example embodiment, both the top and bottom surfaces 220, 222 may include sloped surfaces 218 transitioning the holding structure 210 from the first height (H1) to the second height (H2)

A depth of the holding structure 210 may be selected to not materially alter a length of the vehicle 100. In at least one example embodiment, the holding structure 210 may have an average depth greater than or equal to about 75.5 millimeters to less than or equal to about 118 millimeters. The holding structure 210 may include third and fourth opposing outer regions (or portions or sections or ends) 224, 226 and a middle region (or portion or section) 228 therebetween. The third and fourth opposing outer regions 224, 226 may have a first depth (D1). The second middle region 228 may have a second depth (D2) that is greater than the first depth (D1). In at least one example embodiment, the first depth (D1) may be about 125.5 millimeters, and the second depth (D2) may be about 168 millimeters.

The holding structure 210 has a front (or third) surface 230 and an opposing rear (or fourth) surface 232, where the rear surface 232 is nearest to the vehicle 100 and the front surface 230 is furthest from the vehicle 100. At least one of the from and rear surfaces 230, 232 may include a sloped surface 234 transitioning the holding structure 210 from the first depth (D1) to the second depth (D2). In at least one example embodiment, the front surface 230 may include slope surfaces 234 transitioning the holding structure 210 from the first depth (D1) to the second depth (D2), while the rear surface 232 is generally flat.

The holding structure 210 has a first end 236 and an opposing second end 238. In at least one example embodiment, at least one of the first and second ends 236, 238 may include a second sloped surface 239 that slopes from the front surface 230 towards the rear surface 232.

The holding structure 210 may include one or more apertures or indentations or grooves or openings configured to allow for the passage of, or access to, various wiring harnesses or assemblies and/or other components of the different frame structures, like tie down chains and/or fuel neck door cover, and/or to allow for the modular balancing system 400 to be aligned with and fitted to the different frame structures. The one or more apertures or indentations or grooves or openings of the holding structure 210 may also provide protection for the various wiring harnesses or assemblies and/or other components of the different frame structures, like tie down chains and/or fuel neck door cover. In at least one example embodiment, the holding structure 210 may include a first aperture 240A and a second aperture 240B, where the first and second apertures 240A, 240B are configured to allow for the passage of, or access to, tie down chains.

Figure 3A:
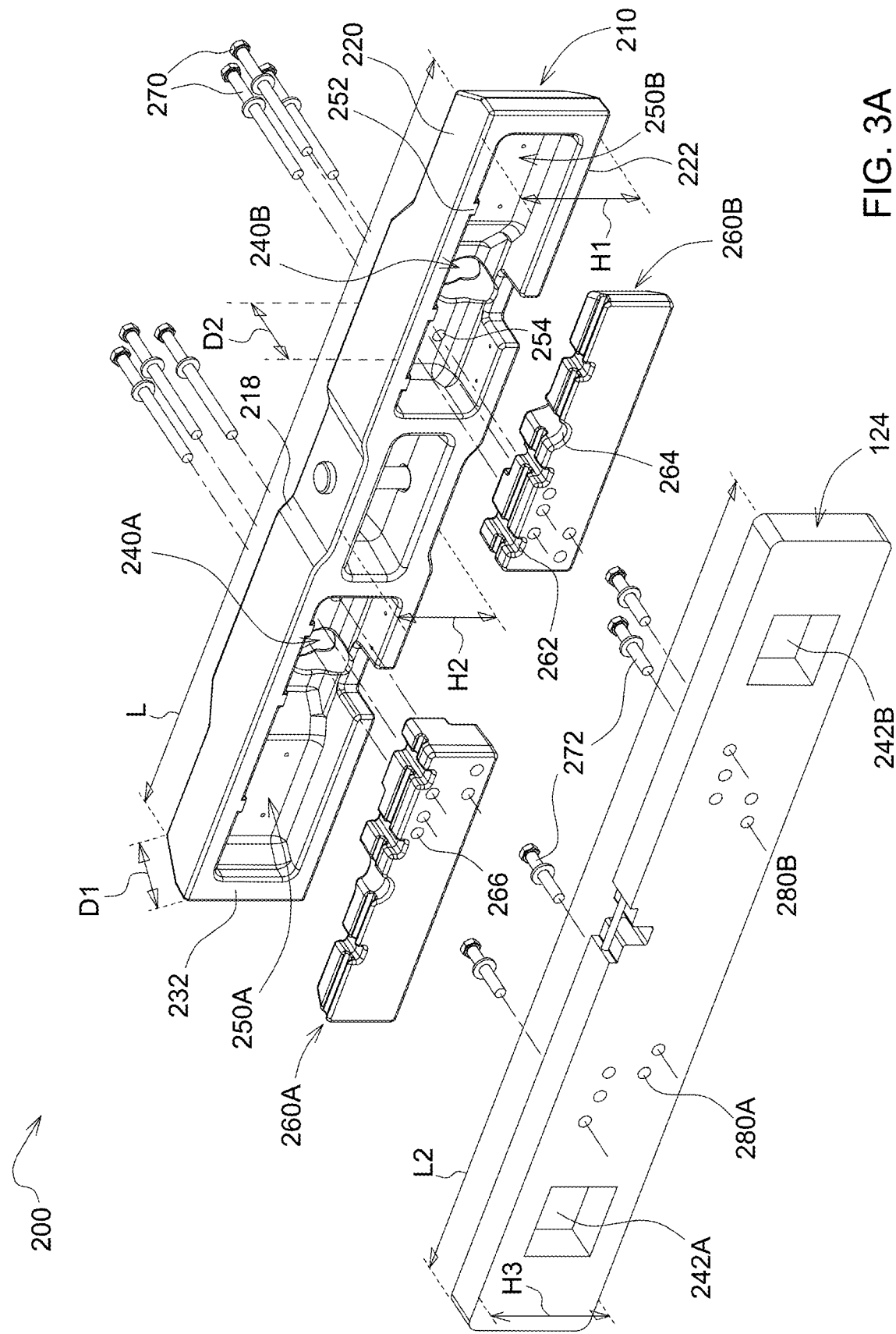
FIG. 3A is a rear, perspective view of the modular balancing system illustrated in FIG. 1A, where modular weights are aligned with but not received by a holding structure.
Figure 3B:
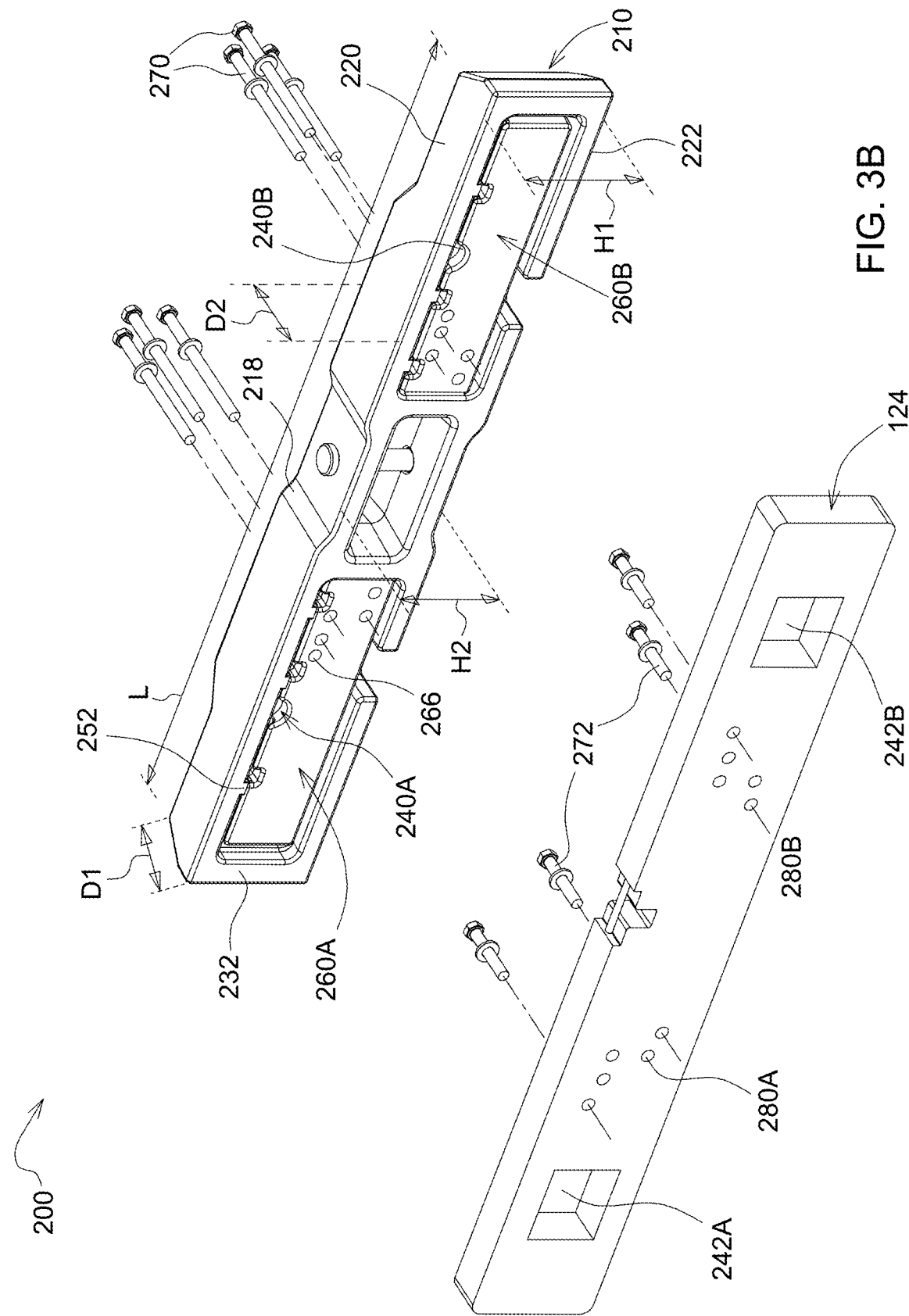
FIG. 3B is another rear, perspective view of the modular balancing system illustrated in FIG. 1A where the modular weights are aligned with an received by the holding structure.

FIG. 3A is a first rear, perspective view of the modular balancing system 200. FIG. 3B is a second rear, perspective view of the modular balancing system 200. The holding structure 210 includes one or more cavities (or pockets) 250A, 250B. In at least one example embodiment, the holding structure 210 may include a first cavity 250A and a second cavity 250B. The first cavity 250A may be disposed in, or correspond with, the first outer region 212. The second cavity 250B may be disposed in, or correspond with, the second outer region 214. In each instances, the one or more cavities 250A, 250B are accessible from the rear surface 232 of the holding structure 210.

Each of the one or more cavities 250A, 250B is configured to receive one or more modular weights. In at least one example embodiment, the first cavity 250A is configured to receive a first modular weight 260A and the second cavity 250B is configured to receive a second modular weight 260B. The first and second modular weights 260A, 260B are similarly configured mirror images. Although only two total modular weights 260A, 260B are illustrated, it should be appreciated that, in various other example embodiments, the holding structure 210 may receive one or more modular weights distributed between the one or more cavities 250A, 250B. The number of modular weights selected may be dependent upon the required weight balancing and structural stability of the vehicle 100, or other vehicle, thus providing flexibility and versatility in the use of the modular balancing system 200.

Each of the one or more cavities 250A, 250B may one or more projections 252 that help to align the one or more modular weights 260A, 260B as received by the one or more cavities 250A, 250B. Each of the one or more modular weights 260A, 260B may include one or more first grooves 262 that correspond with and are configured to receive at least a portion of the one or more projections 252. Further, each of the one or more modular weights 260A, 260B may include one or more second grooves 264 that correspond with the one or more apertures 240A, 240B of the holding structure 210.

The weight plate 124 may include one or more apertures configured to allow for the passage of, or access to, various wiring harnesses or assemblies and/or other components of the different frame structures, like tie down chains and/or fuel neck door cover. The one or more apertures of the weight plate may also provide protection for the various wiring harnesses or assemblies and/or other components of the different frame structures, like tie down chains and/or fuel neck door cover. The one or more apertures of the weight plate 124 may align with the one or more apertures of the holding structure 210. In at least one example embodiment, the weight plate 124 may include a first aperture 242A that aligns with the first aperture 240A of the holding structure 210 and a second aperture 242B that aligns with the second aperture 240B of the holding structure 210 to allow for the passage of, or access to, tie down chains.

The modular balancing system 200 (and optionally the weight plate 124) may be attached to the frame structure 122 using common hardware. For example, the holding structure 210 may include a first plurality of holes 254, where each hole of the plurality is configured to receive a first coupler 270 that extends therethrough to secure the modular balancing system 200 (and optionally the weight plate 124) to the frame structure 122. In at least one example embodiment, the holding structure 210 may include a first set of holes that are disposed in, or corresponds with, the first outer region 212 and a second set of holes that are disposed in, or corresponds with, the second outer region 214. The first set of holes 254 may include, for example, three holes 254. The second set of holes 254 may include, for example, three holes 254.

Each of the one or more modular weights 260A, 260B may include a second plurality of holes 266. The second plurality of holes 266 may correspond with the first plurality of holes 254 such that the first couplers 270 extend through the holding structure 210 and each of the or more modular weights 260A, 260B to secure the modular balancing system 200 (including the holding structure 210 and the modular weights 260A, 260B) to the frame structure 122. In at least one example embodiment, the first set of holes 254 may correspond with the first modular weight 260A and the second set of holes 254 may correspond with the second modular weight 260B.

The weight plate 124 may include a third plurality of holes 280A. The third plurality of holes 280A may also correspond with the first plurality of holes 254 such that the first couplers 270 extend through the holding structure 210 and each of the or more modular weights 260A, 260B to secure the modular balancing system 200 (including the holding structure 210 and the modular weights 260A, 260B) and the weight plate 124 to the frame structure 122. Similar to the first plurality of holes 254, in at least one example embodiment, the third plurality of holes 280A may include a first set of holes that correspond with the first set of holes of the first plurality of holes and a second set of holes that correspond with the second set of holes of the first plurality of holes. In at least one example embodiment, the weight plate 124 may further include a fourth plurality of holes 280B that are configured to receive a second coupler 272 that extends therethrough to secure the weight plate 124 to the frame structure 122.

The first and second cavities 250A, 250B may be mirror images and the one or more modular weights 260A, 260B may each have the same configuration. The holding structure 210 may be formed using a first material and the one or more modular weights 260A, 260B may be formed using a second material. The first and second materials may be selected to satisfy a weight requirement of a tip load requirement for the vehicle 100. In at least one example embodiment, the holding structure 210 may be a steel casting. In at least one example embodiment, the second material may include ductile or gray iron. The shell configuration of the holding structure 210 relative to the one or more modular weights 260A, 260B may help to optimize ductile cast iron material, which may provide notably cost benefits.

Figure 4A:
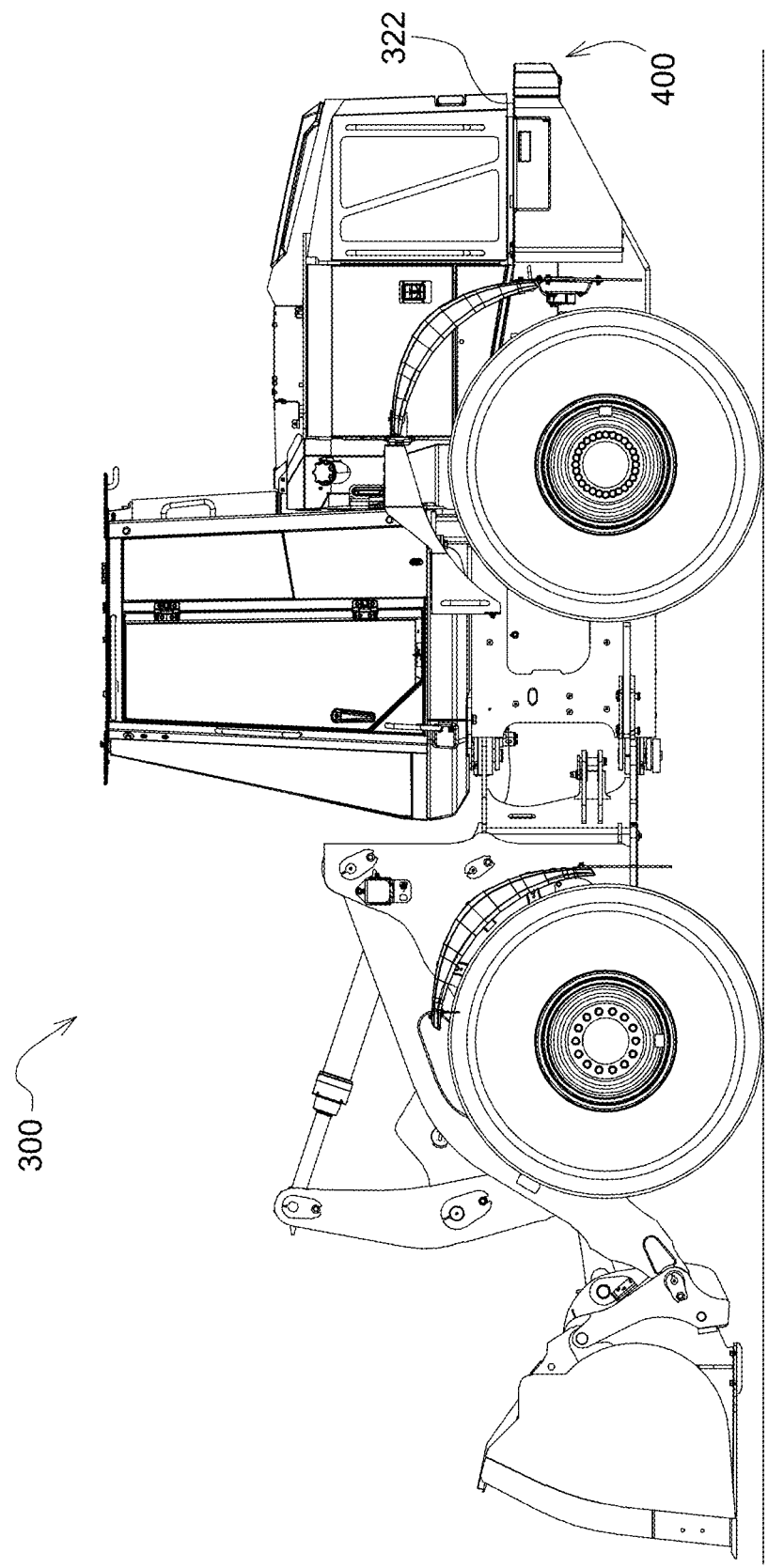
FIG. 4A is a sideview of an example vehicle having another example modular balancing system in accordance with at least one example embodiment of the present disclosure.
Figure 4B:
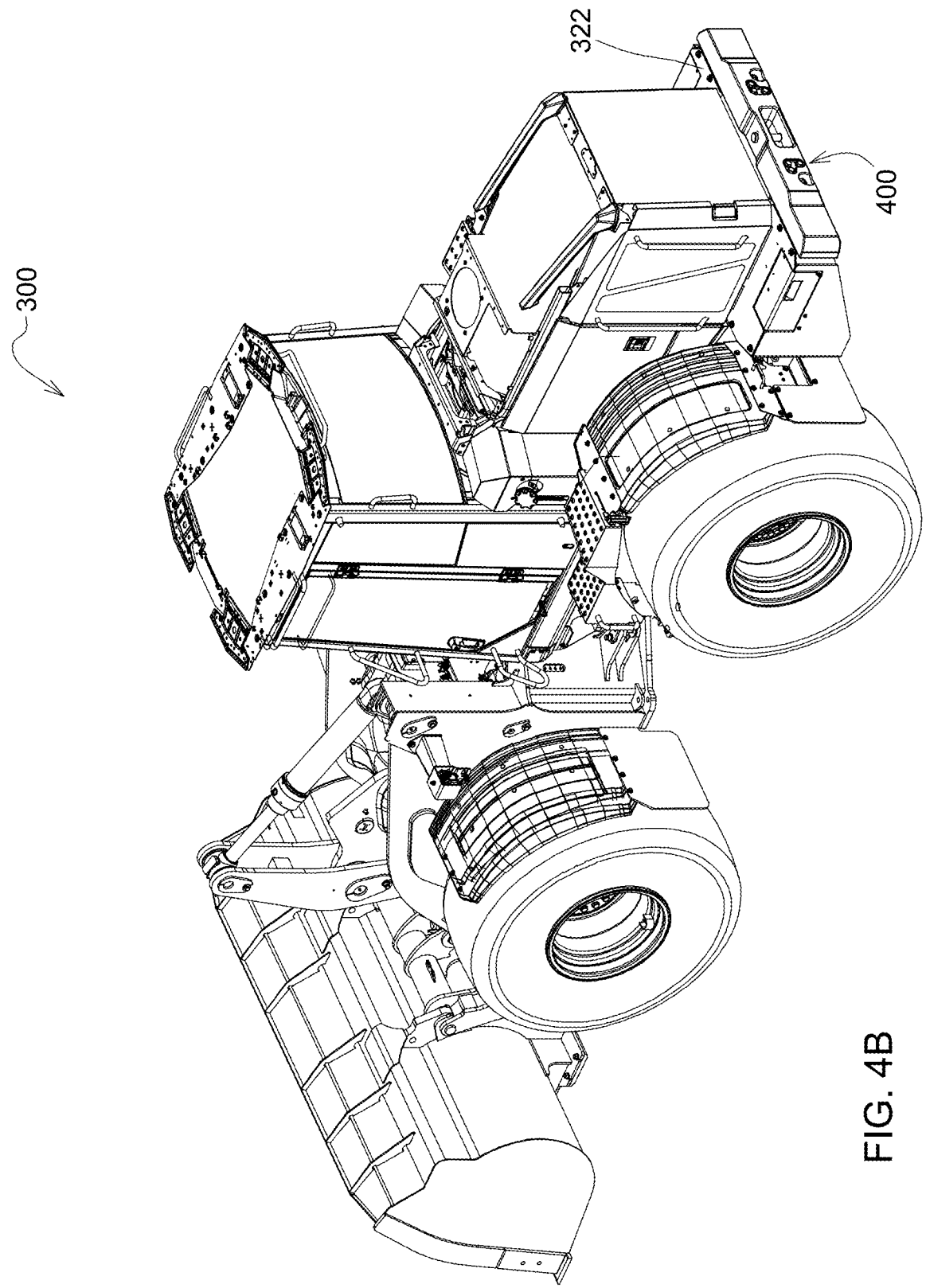
FIG. 4B is a rear, perspective view of the example vehicle illustrated in FIG. 4A.
Figure 5:
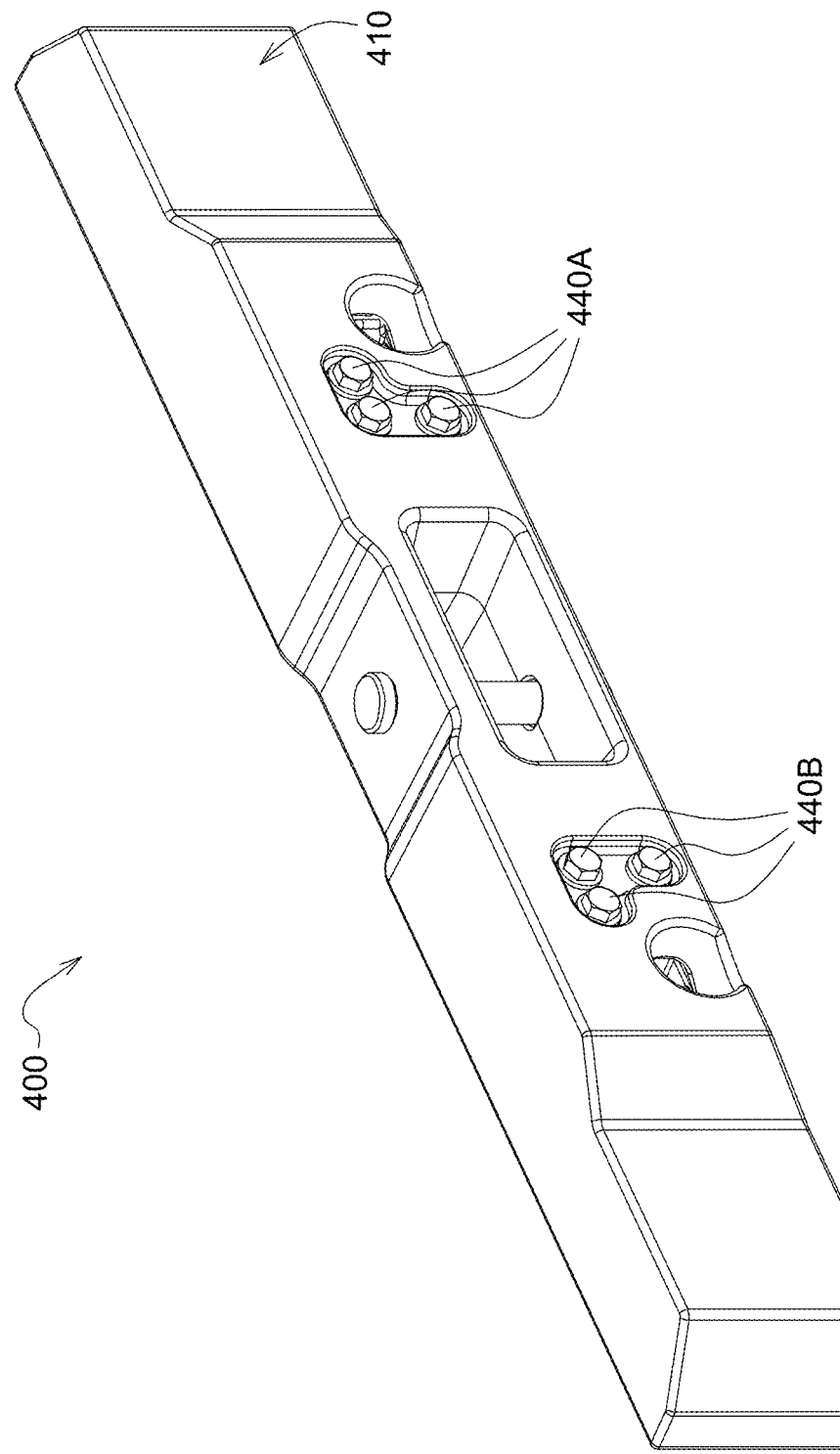
FIG. 5 is a front, perspective view of the modular balancing system illustrated in FIG. 4A.
Figure 6A:
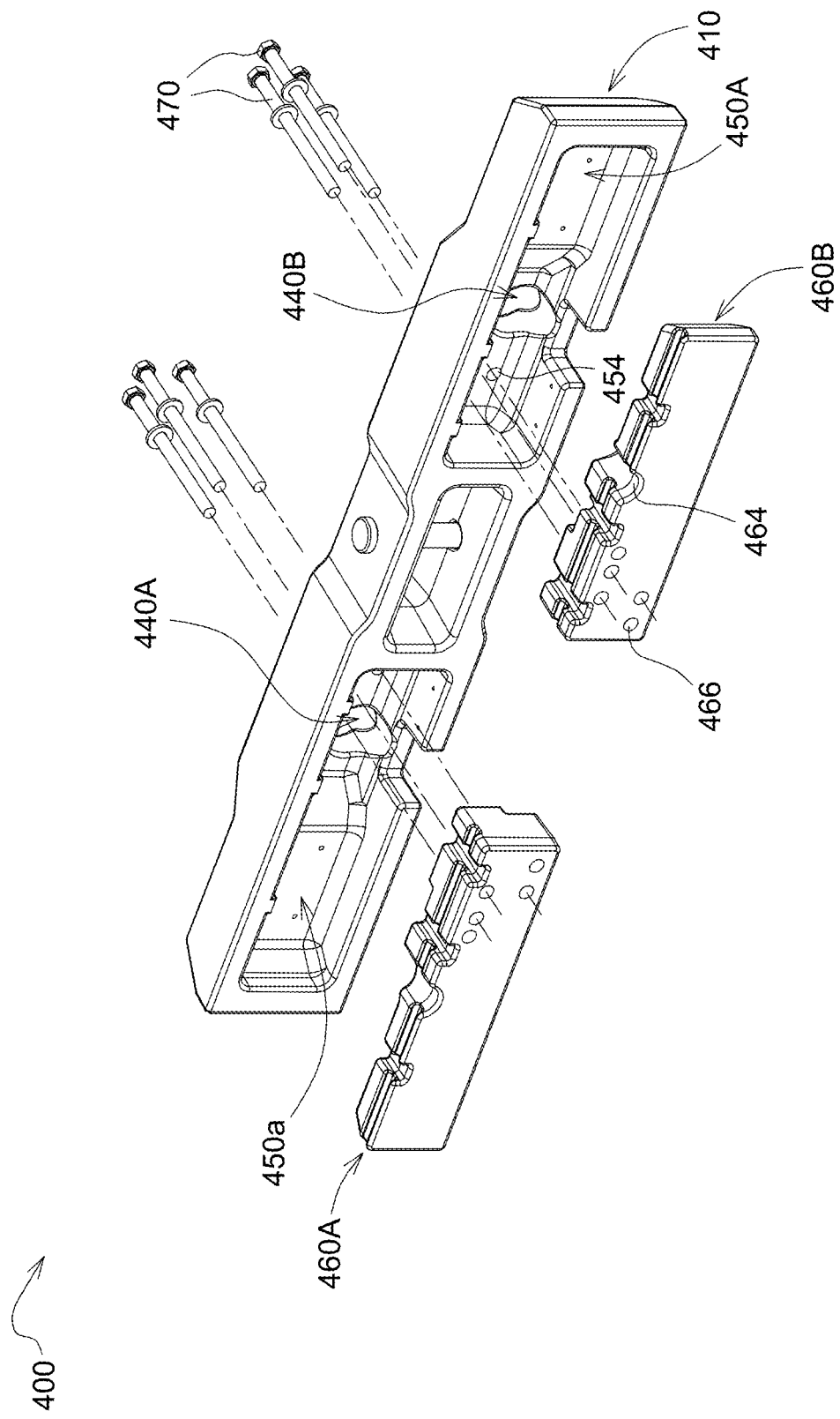
FIG. 6A is a rear, perspective view of the modular balancing system illustrated in FIG. 4A, where modular weights are aligned with but not received by a holding structure.
Figure 6B:
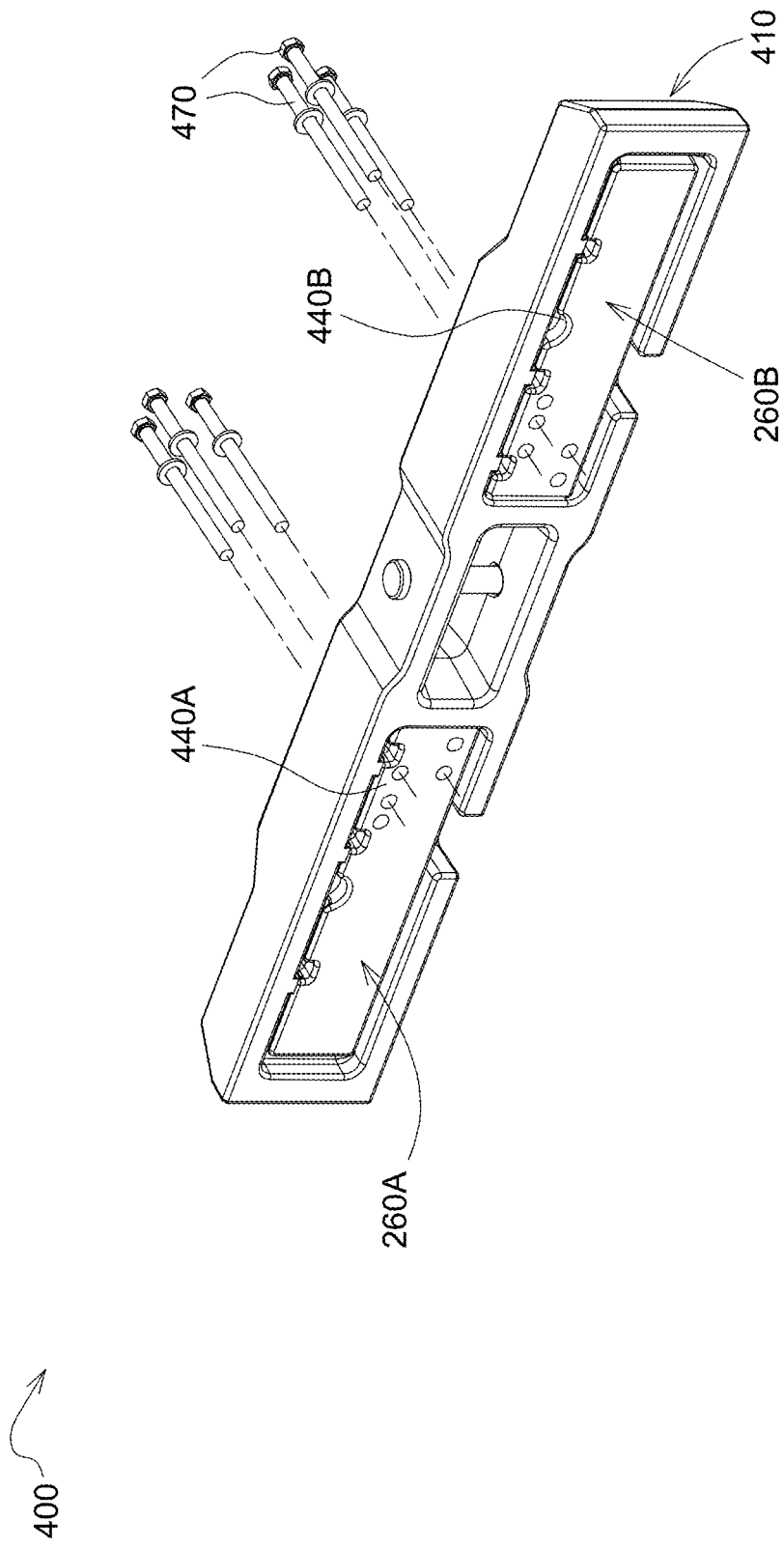
FIG. 6B is another rear, perspective view of the modular balancing system illustrated in FIG. 4A where the modular weights are aligned with an received by the holding structure.

FIG. 4A is a sideview of a vehicle 300 (e.g., front-end loader) including an example modular balancing system 400. FIG. 4B is a rear, perspective view of the vehicle 300 including the example modular balancing system 400. FIG. 5 is a front, perspective view of the modular balancing system 400. FIG. 6A is a first rear, perspective view of the modular balancing system 400. FIG. 6B is a second rear, perspective view of the modular balancing system 400.

The modular balancing system 400 as illustrated in FIGS. 4A-6A is the same as the modular balancing system 200 illustrated in FIGS. 1-3B except that a weight plate is not disposed between the modular balancing system 400 and a frame structure 322 of the vehicle 300.

Like the modular balancing system 200 illustrated in FIGS. 1-3B, the modular balancing system 400 as illustrated in FIGS. 4A-6B includes a holding structure 410 that is configured to receive one or more modular weights 460A, 460B. For example, the holding structure 410 may include one or more cavities 450A, 450B that receive the one or more modular weights 460A, 460B.

Further, like the holding structure 210 of the modular balancing system 200 illustrated in FIGS. 1-3B, the holding structure 410 of the modular balancing system 400 as illustrated in FIGS. 4A-6B may include a first plurality of holes 454, where each hole of the plurality is configured to receive a coupler 470 that extends therethrough to secure the modular balancing system 400 to the frame structure 322. The modular weights 460A, 460B may include a second plurality of holes 466. The second plurality of holes 466 of the modular weights 460A, 460B are aligned with the first plurality of holes 454 of the holding structure 410 to receive couplers 470 that secure the modular balancing system 400 the frame structure 322.

Further, like the holding structure 210 of the modular balancing system 200 illustrated in FIGS. 1-3B, the holding structure 410 of the modular balancing system 400 as illustrated in FIGS. 4A-6B may include one or more apertures or indentations or grooves or openings configured to allow for the passage of, or access to, various wiring harnesses or assemblies and/or other components of the different frame structures, like tie down chains and/or fuel neck door cover, and/or to allow for the modular balancing system 400 to be aligned with and fitted to the different frame structures. The one or more apertures or indentations or grooves or openings of the holding structure 410 may also provide protection for the various wiring harnesses or assemblies and/or other components of the different frame structures, like tie down chains and/or fuel neck door cover.

In at least one example embodiment, the holding structure 410 may include a first aperture 440A and a second aperture 440B, where the first and second apertures 440A, 440B are configured to allow for the passage of, or access to, tie down chains. Each of the one or more modular weights 460A, 460B may include one or more grooves 464 that correspond with the one or more apertures 440A, 440B of the holding structure 410 to create a continuous passage for, or access to, the various wiring harnesses or assemblies and/or other components of the different frame structures, like tie down chains and/or fuel neck door cover.

At least some example embodiments of the present disclosure provide hitch structures for heavy equipment applications. The hitch structures include a number of structures that help to integrate technological components, like ultrasonic sensors and/or radar for the auto braking and/or rear object detection. The weight of hitch structure may also help to provide balance and stability to mechanical systems of the heavy equipment applications.

Although front-end loaders are discussed herein as an example heavy equipment application, it should be appreciated that, in various other example embodiments, hitch structures may be similarly useful for other vehicles. The hitch structure as detailed herein may be useful, for example, for mining vehicles and/or construction vehicles and/or utility vehicles. The hitch structures as detailed herein may be useful, for example, for backhoe loaders, tractors, bulldozers, forklifts, cranes, haul trucks, underground graders, rock breakers, and the like.

Figure 7:
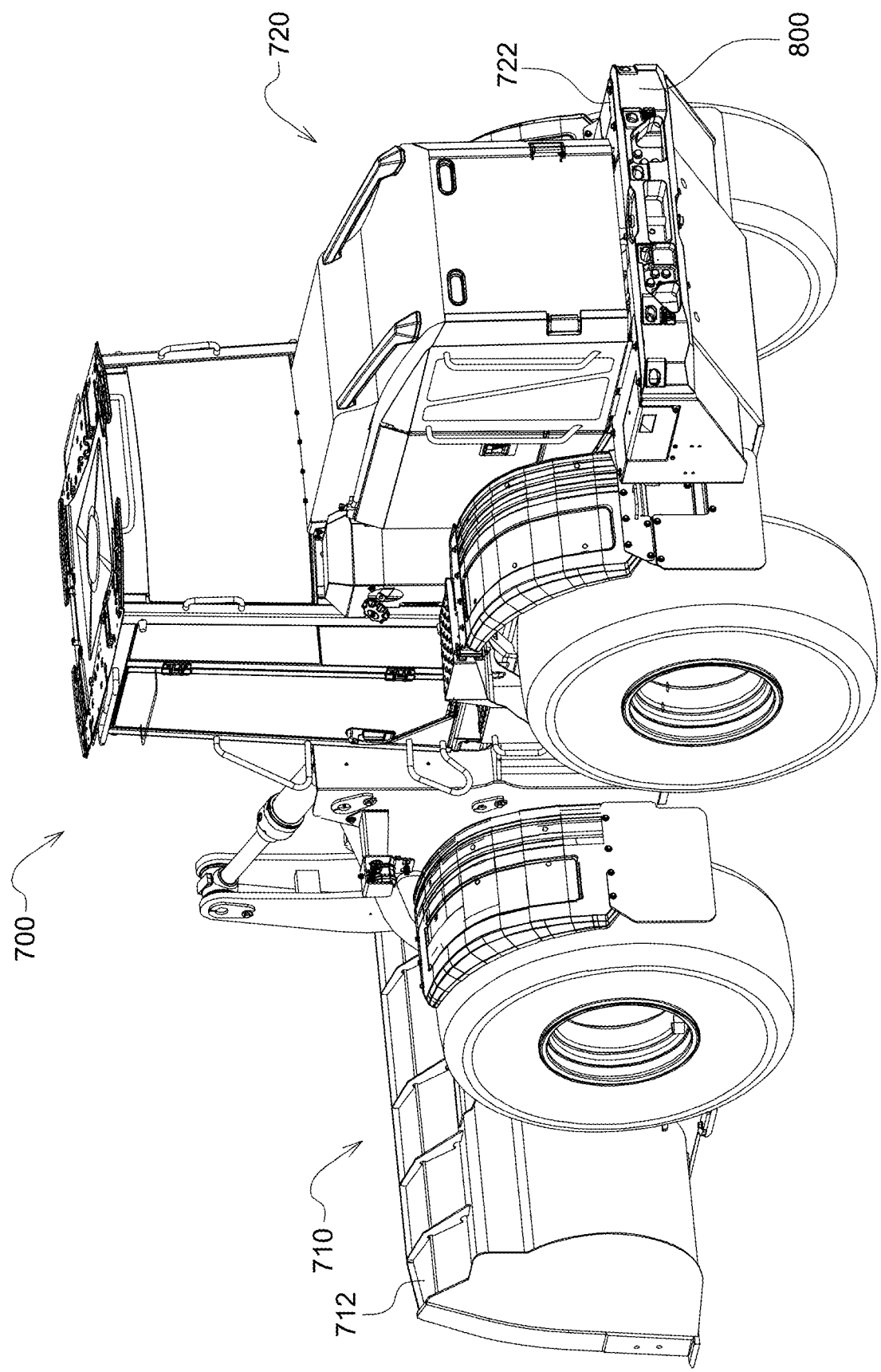
FIG. 7 is a rear, perspective view of an example vehicle having an example hitch structure in accordance with at least one example embodiment of the present disclosure.

FIG. 7 is a rear, perspective view of a vehicle 700 (e.g., front-end loader) including an example hitch structure (or member or system) 800.

Like the vehicle 100 illustrated in FIGS. 1A and 1B and the vehicle 300 illustrated in FIGS. 4A and 4B, the vehicle 700 includes a front (or first) end 710 and an opposing rear (or second) end 720. In at least one example embodiment, the front end 710 may include a bucket 712. The rear end 720 includes the hitch member 800 secured to a (rear) frame structure 722 of the vehicle 700. The hitch member 800 is aligned with an external surface of the frame structure 722 and coupled to the frame structure 722. For example, the hitch member 800 may be bolted to the frame structure 722. The hitch member 800 may be readily secured to a variety of existing frame structures, in addition to the frame structure 722, using common hardware.

Figure 8:
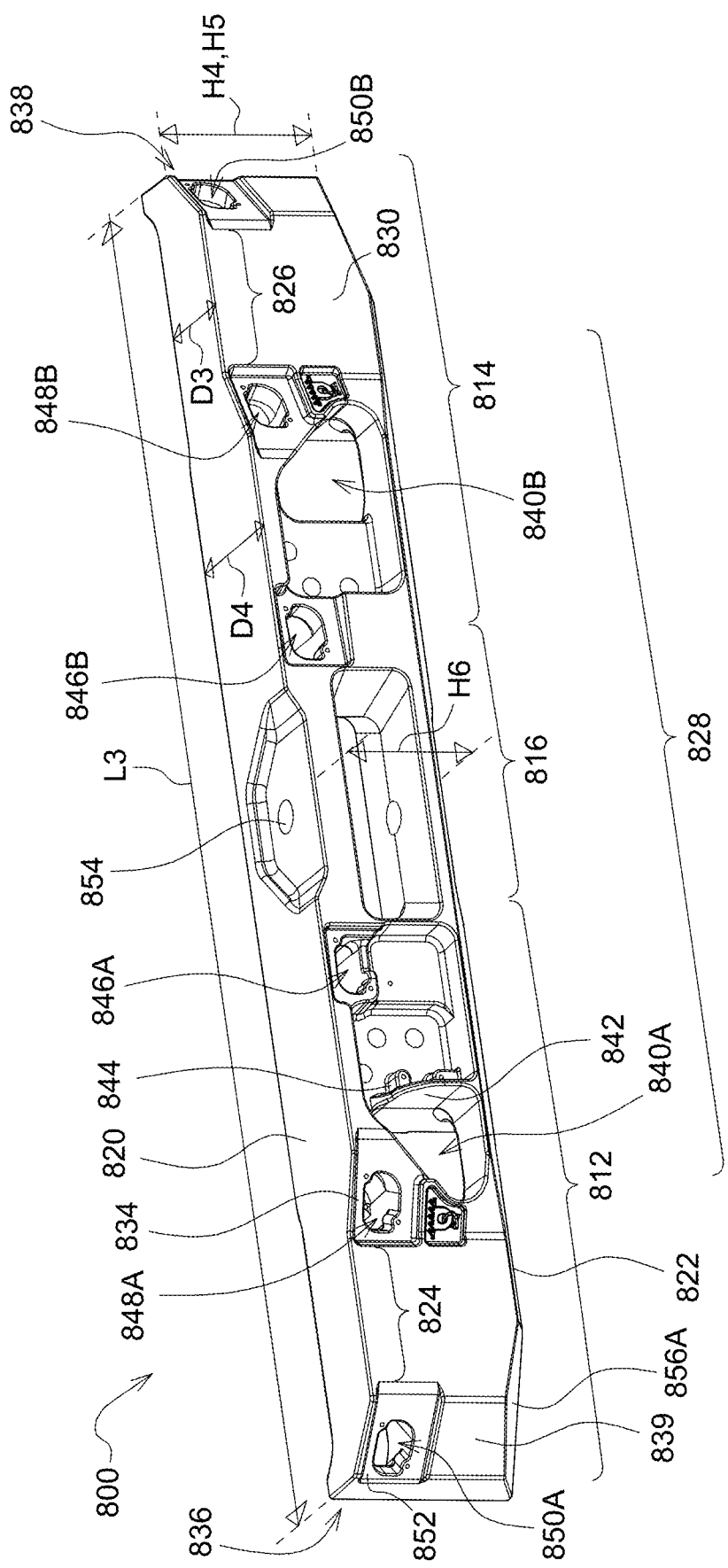
FIG. 8 is a front, perspective view of the example hitch structure illustrated in FIG. 7.
Figure 9A:
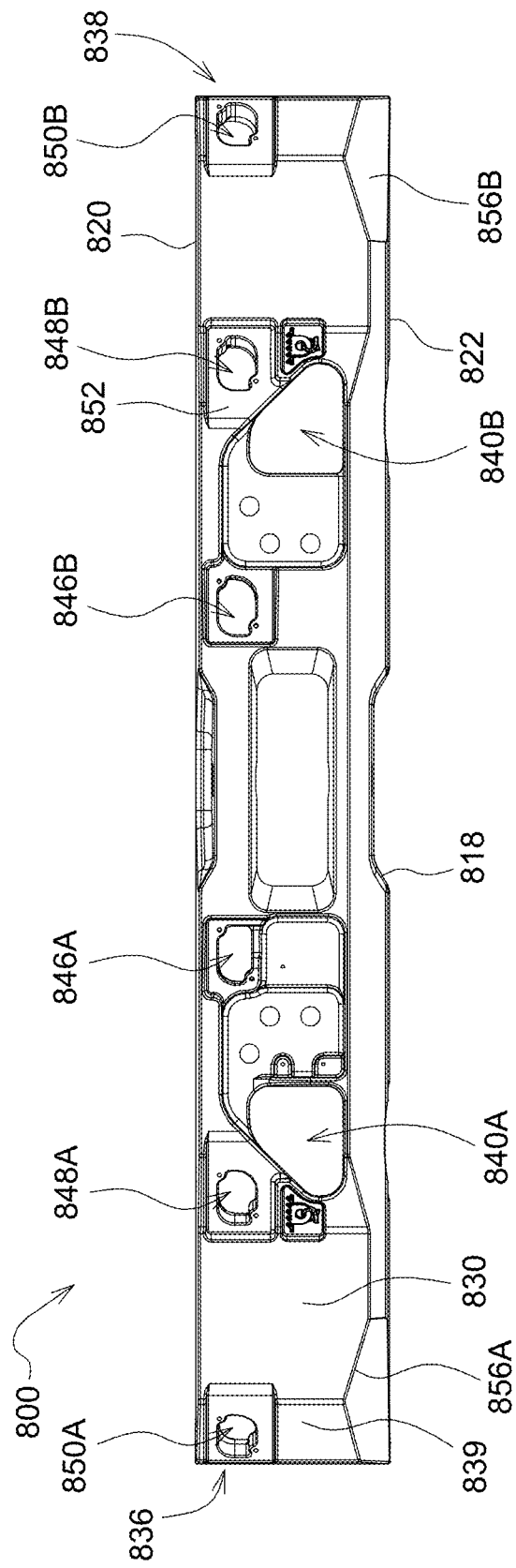
FIG. 9A is a front view of the example hitch structure illustrated in FIG. 7 without a wiring or sensor harness or assembly.

FIG. 8 is a front, perspective view of the hitch member 800. FIG. 9A is a front view of the example hitch member 800 without a wiring or sensor harness or assembly 864. FIG. 9B is a front view of the example hitch structure illustrated in FIG. 7 including the wiring or sensor harness or assembly 864.

Like the holding structure 210 of the modular balancing system 200 illustrated in FIGS. 1A-3B and/the holding structure 410 of the modular balancing system 500 illustrated in FIGS. 4A-6B, the hitch member 800 may have a general elongated shape corresponding, or compatible, with a variety of existing frame structures. For example, the hitch member 800 may have an average length (L3) that is greater than an average height (H4) of the hitch member 800. The hitch member 800 may have opposing first and second outer regions (or portions or sections or ends) 812, 814 and a first middle region (or portions or sections) 816. The first and second outer regions 812, 814 may have a first height (H5), and the first middle region 816 may have a second height (H6) that is less than the first height (H5). The hitch member 800 has a top (or first) surface 820 and an opposing bottom (or second) surface 822. At least one of the top and bottom surfaces 820, 822 may include a sloped surface 818 that transitions the hitch member 800 from the first height (H5) to the second height (H6). In at least one example embodiment, both the top and bottom surfaces 820, 822 may include sloped surfaces 818 transitioning the hitch member 800 from the first height (H5) to the second height (H6).

Like the holding structure 210 of the modular balancing system 200 illustrated in FIGS. 1A-3B and/the holding structure 410 of the modular balancing system 500 illustrated in FIGS. 4A-6B, a depth of the hitch member 800 may be selected to not materially alter a length of the vehicle 700. The hitch member 800 may include third and fourth opposing outer regions (or portions or sections or ends) 824, 826 and a middle region (or portion or section) 828 therebetween. The third and fourth opposing outer regions 824, 826 may have a first depth (D3). The second middle region 828 may have a second depth (D4) that is greater than the first depth (D3).

The hitch member 800 has a front (or third) surface 830 and an opposing rear (or fourth) surface 832, where the rear surface 832 is nearest to the vehicle 700 and the front surface 830 is furthest from the vehicle 700. At least one of the from and rear surfaces 830, 832 may include a sloped surface 834 transitioning the hitch member 800 from the first depth (D3) to the second depth (D4). In at least one example embodiment, the front surface 830 may include slope surfaces 834 transitioning the hitch member 800 from the first depth (D3) to the second depth (D4), while the rear surface 832 is generally flat.

The hitch member 800 has a first end 836 and an opposing second end 838. In at least one example embodiment, at least one of the first and second ends 836, 838 may include a second sloped surface 839 that slopes from the front surface 830 towards the rear surface 832.

In at least one example embodiment, the hitch member 800 may further include one or more chamfered surfaces 856A, 856B. The one or more chamfered surfaces improve the styling of the hitch member 800, while also helping to ensure alignment of a saddle pod and/or fuel tank guard of the vehicle 700. In at least one example embodiment, the hitch member 800 may include a first chamfered surface 856A at or near a first end 836 of the hitch member 800. The first chamfered surface 856A may at least partially extend along both the third outer regions 824 and the sloped portion 839 of the first end 836 of the hitch member 800. In at least one example embodiment, the hitch member 800 may include a second chamfered surface 856B at or near a second end 838 of the hitch member 800. The second chamfered surface 856B may at least partially extend along both the fourth outer region 826 and the sloped portion 839 of the second end 838 of the hitch member 800.

Like the holding structure 210 of the modular balancing system 200 illustrated in FIGS. 1A-3B and/the holding structure 410 of the modular balancing system 500 illustrated in FIGS. 4A-6B, the hitch member 800 may include one or more apertures or indentations or grooves or openings configured to allow for the passage of, or access to, various wiring harnesses or assemblies and/or other components of the different frame structures, like tie down chains and/or fuel neck door cover, and/or to allow for the hitch member 800 to be aligned with and fitted to the different frame structures. The one or more apertures or indentations or grooves or openings of the hitch member 800 may also provide protection for the various wiring harnesses or assemblies and/or other components of the different frame structures, like tie down chains and/or fuel neck door cover.

In at least one example embodiment, the hitch member 800 may include a first aperture 840A and a second aperture 840B, where the first and second apertures 840A, 840B are configured to allow for the passage of, or access to, tie down chains. In at least one example embodiment, at least one of the first aperture 840A and the second aperture 840B may include, or be defined by, one or more blended wall features 842 that extends, for example, from the front surface 830 of the hitch member 800. The one or more blended wall features 842 may help to protect bosses 844 that may be configured to receive or support one or more sensors or sensing components. In at least one example embodiment, at least one of the first aperture 840A and the second aperture 840B may have a general triangular shape. Although a rectangular shape is illustrated, it should be appreciated that, in various example embodiments, the apertures 840A, 840B may have a variety of shapes and configurations.

In at least one example embodiment, additionally or alternatively, to the first and second apertures 840A, 840B, the hitch member 800 may include one or more other apertures that are configured to allow for the pass of, or access to, different wiring harnesses or assemblies. For example, additionally or alternatively, to the first and second apertures 840A, 840B, the hitch member 800 may include one or more of a third aperture 846A and a fourth aperture 846B. In at least one example embodiment, the third aperture 846A may be disposed between the first aperture 840A and the first middle region 816. In at least one example embodiment, the fourth aperture 846B may be disposed between the second aperture and the first middle region 816.

Additionally, or alternatively, to the first aperture 840A and/or the second aperture 840B and/or the third aperture 846A and/or the fourth aperture 846B, the hitch member 800 may include one or more of a fifth aperture 848A and a sixth aperture 848B. In at least one example embodiment, the fifth aperture 848A may be disposed between the first aperture 840A and the third outer regions 824. In at least one example embodiment, the sixth aperture 848B may be disposed between the second aperture 840B and the fourth outer regions 826.

Additionally, or alternatively, to the first aperture 840A and/or the second aperture 840B and/or the third aperture 846A and/or the fourth aperture 846B and/or the fifth aperture 848A and/or the sixth aperture 848B, the hitch member 800 may include one or more of a seventh aperture 850A and a sixth aperture 850B. In at least one example embodiment, the seventh aperture 850A may be disposed on or near the sloped surface 839 of the first end 836 of the hitch member 800. In at least one example embodiment, the eighth aperture 850B may be disposed on or near the sloped surface 839 of the second end 838 of the hitch member 800.

In at least one example embodiment, the third aperture 846A and/or the fourth aperture 846B and/or the fifth aperture 848A and/or the sixth aperture 848B and/or the seventh aperture 850A and/or the eighth aperture 850B may be used to help guide wiring or sensor harnesses or assemblies from a first end 836 of the hitch member 800 to the second end 838 of the hitch member 800. In at least one example embodiment, the third aperture 846A and/or the fourth aperture 846B and/or the fifth aperture 848A and/or the sixth aperture 848B and/or the seventh aperture 850A and/or the eighth aperture 850B may be used to protect a wiring or sensor harness held or supported by the hitch member 800. In at least one example embodiment, the third aperture 846A and/or the fourth aperture 846B and/or the fifth aperture 848A and/or the sixth aperture 848B and/or the seventh aperture 850A and/or the eighth aperture 850B may include one or more extended portions 852. For example, the one or more extended portions 852 may extend from the front surface 830 of the holding structure 310 and partially or completely surround at least one of the third aperture 846A and/or the fourth aperture 846B and/or the fifth aperture 848A and/or the sixth aperture 848B and/or the seventh aperture 850A and/or the eighth aperture 850B. The one or more extended portions 852 may change the distance to the components (e.g., a wiring or sensor harness or assembly) held or supported by the hitch member 800 and accessible or supported by the third aperture 846A and/or the fourth aperture 846B and/or the fifth aperture 848A and/or the sixth aperture 848B and/or the seventh aperture 850A and/or the eighth aperture 850B from rear impact of the vehicle 700. The one or more extended portions 852 may help to provide protection to components (e.g., a wiring or sensor harness or assembly) held or supported by the hitch member 800 and accessible or supported by the third aperture 846A and/or the fourth aperture 846B and/or the fifth aperture 848A and/or the sixth aperture 848B and/or the seventh aperture 850A and/or the eighth aperture 850B. For example, the one or more extended portions 852 may help to protect components (e.g., a wiring or sensor harness or assembly) held or supported by the hitch member 800 and accessible or supported by the third aperture 846A and/or the fourth aperture 846B and/or the fifth aperture 848A and/or the sixth aperture 848B and/or the seventh aperture 850A and/or the eighth aperture 850B from rear impact of the vehicle 700.

In at least one example embodiment, at least one of the third aperture 846A, the fourth aperture 846B, the fifth aperture 848A, the sixth aperture 848B, the seventh aperture 850A, and the eighth aperture 850B may have a generally rectangular shape with rounded edges. Although a rectangular shape is illustrated, it should be appreciated that, in various example embodiments, the apertures 846A, 846B, 848A, 848B, 850A, 850B may have a variety of shapes and configurations.

In at least one example embodiment, the third aperture 846A, the fourth aperture 846B, the fifth aperture 848A, the sixth aperture 848B, the seventh aperture 850A, and the eighth aperture 850B may be symmetrically disposed across the length (L3) of the hitch member 800 with regard to a center pin aperture 854.

Figure 10A:
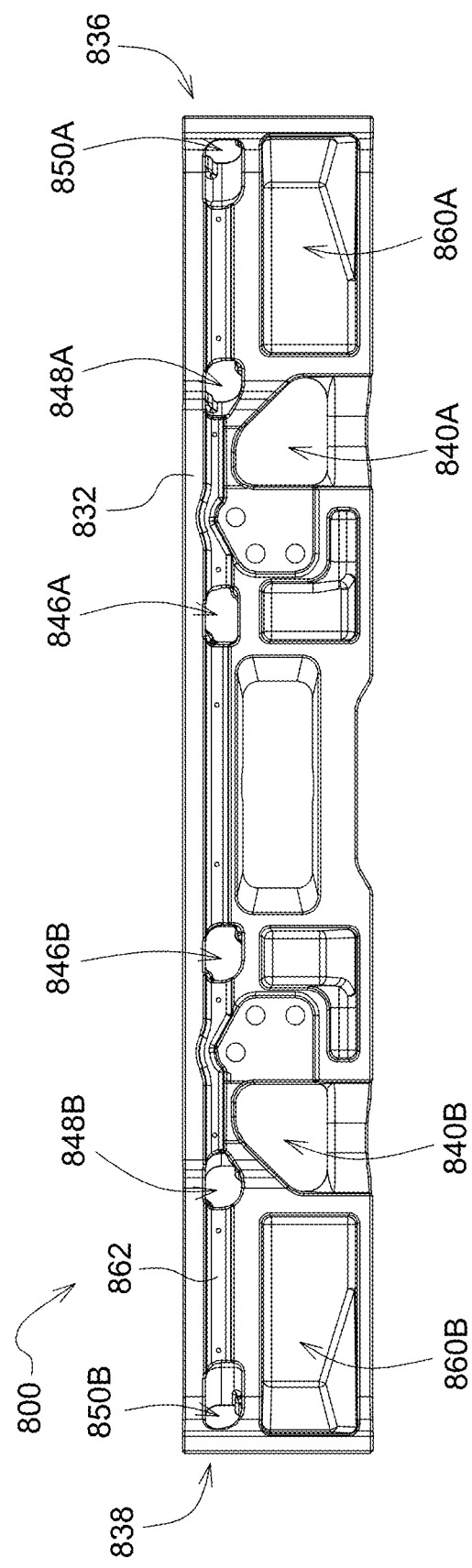
FIG. 10A is a rear view of the example hitch structure illustrated in FIG. 7 without a wiring or sensor harness or assembly.
Figure 10B:
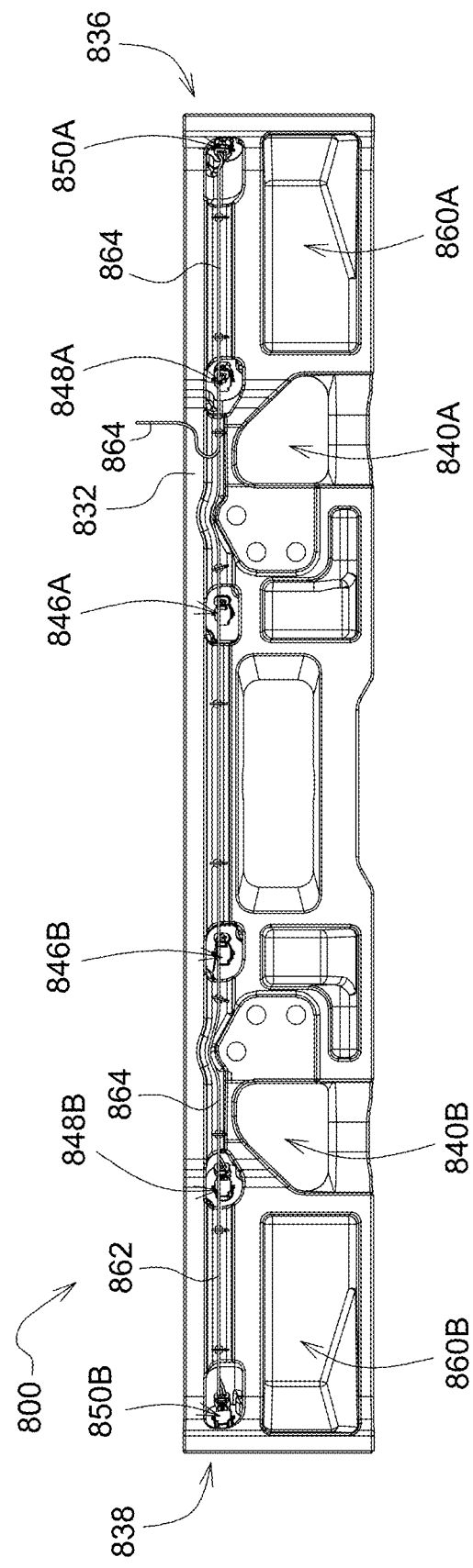
FIG. 10B is a rear view of the example hitch structure illustrated in FIG. 7 including a wiring or sensor harness or assembly.

FIG. 10A is a rear view of the example hitch member 800 without the wiring or sensor harness or assembly 864. FIG. 10A is a rear view of the example hitch member 800 including the wiring or sensor harness or assembly 864.

The rear surface 832 of the hitch member 800 may include a groove (or channel) 862 that extends along at least a portion of the hitch member 800 and that is configured to receive or support wiring or sensor harnesses or assemblies 864. That is, the groove 862 may act as a guide for the wiring or sensor harnesses or assemblies 864. Including the wiring or sensor harnesses or assemblies 864 within the groove 862 of the hitch member 800 may help to minimize the necessary length of the wiring or sensor harnesses or assemblies while also providing protection to the wiring or sensor harnesses or assemblies that may occur, for example, by routing the wiring or sensor harnesses or assemblies through a channel.

In at least one example embodiment, the groove 862 may extend continuously from the first end 836 to the second end 838 of the hitch member 800. For example, the groove 862 may extend along greater than or equal to about 70% (e.g., greater than or equal to about 75%, greater than or equal to about 80%, greater than or equal to about 85%, greater than or equal to about 90%, or greater than or equal to about 95%) of the total length (L3) of the hitch member 800. The groove 862 may include the third aperture 846A, the fourth aperture 846B, the fifth aperture 848A, the sixth aperture 848B, the seventh aperture 850A, and the eighth aperture 850B.

The wiring or sensor harnesses or assemblies 864 may be pressed and routed inside the groove 862 such that the wiring or sensor harnesses or assemblies 864 do not interfere with the frame structure 722 of the vehicle 700 and/or the saddle pod of the vehicle 700. Although not illustrated, it should be appreciated that, in various embodiments, the groove 862 may include one or more retention features that are configured to hold the wiring or sensor harnesses or assemblies 864 in position within the groove 862. When two or more retention features are included, the retention features may be evenly spaced along the length of the groove 862. In at least one example embodiment, the retention features may include p-clamps or Christmas tree type clamps.

The hitch member 800 may include one or more cavities (or pockets) 860A, 860B. In at least one example embodiment, the hitch member 800 may include a first cavity 860A and a second cavity 860B. The first cavity 860A may be disposed in, or correspond with, the first outer region 812. The second cavity 860B may be disposed in, or correspond with, the second outer region 814. In each instances, the one or more cavities 860A, 860B are accessible from the rear surface 832 of the hitch member 800. In at least one example embodiment, the size or configuration of the one or more cavities 860A, 860B may be varied to adjust an overall weight of the hitch member 800. Although not illustrated, it should be appreciated that, in various example embodiments, the one or more cavities 860A, 860B may be configured to receive one or more modular weights, similar to holding structure 210 of the modular balancing system 200 illustrated in FIGS. 1A-3B and/the holding structure 410 of the modular balancing system 500 illustrated in FIGS. 4A-6B. In at least one example embodiment, the hitch member 800 may include ductile iron grade 550-350-06.

While some example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

Although described with reference to specific examples and drawings, modifications, additions, and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

The invention claimed is:

1. A modular balancing system for a vehicle, the modular balancing system comprising:
 one or more modular weights; and
 a holding structure including one or more cavities configured to receive and hold the one or more modular weights, each of the one or more cavities including one or more projections, each of the one or more modular weights including one or more grooves that correspond with the one or more projections, the one or more projections and the one or more grooves aligning the one or more modular weights within the one or more cavities, the holding structure configured to be coupled to the vehicle.

2. The modular balancing system of claim 1, wherein the holding structure is configured to be coupled to a frame structure of the vehicle, and
the holding structure includes one or more first apertures that receive or allow access to one or more components of the frame structure of the vehicle.

3. The modular balancing system of claim 2, wherein at least one of the one or more first apertures includes one or more blended wall features.

4. The modular balancing system of claim 2, wherein the one or more first apertures extend through the one or more cavities.

5. The modular balancing system of claim 4, wherein each of the one or more modular weights includes one or more grooves that correspond with the one or more first apertures of the holding structure to allow access to the one or more components of the frame structure of the vehicle.

6. The modular balancing system of claim 5, wherein the modular balancing system further comprises:
a weight plate disposed between the holding structure and the vehicle, the weight plate including one or more second apertures that correspond with the one or more first apertures of the holding structure and the one or more grooves of the one or more modular weights to allow access to the one or more components of the frame structure of the vehicle.

7. The modular balancing system of claim 1, wherein the holding structure includes one or more first holes configured to receive one or more first couplers for coupling the holding structure to the vehicle.

8. The modular balancing system of claim 7, wherein
the one or more first holes extend through the one or more cavities, and
each of the one or more modular weights includes one or more second holes that correspond with the one or more first holes, the one or more first couplers extending through the holding structure and the one or more modular weights to couple the holding structure and the one or more modular weights to the vehicle.

9. The modular balancing system of claim 8, wherein the modular balancing system further comprises:
a weight plate disposed between the holding structure and the vehicle, the weight plate including one or more third holes configured to receive one or more second couplers for coupling the weight plate to the vehicle.

10. The modular balancing system of claim 1, wherein
the holding structure includes opposing first and second outer regions and a first middle region disposed therebetween,
the first and second outer regions having a first height, and
the first middle region having a second height that is less than the first height.

11. The modular balancing system of claim 10, wherein
the holding structure includes opposing first and second surfaces,
at least one of the first and second surfaces including first and second sloped portions,
the first sloped portion transitioning between the first outer region and the first middle region, and
the second sloped portion transitioning between the second outer region and the first middle region.

12. The modular balancing system of claim 10, wherein
the holding structure includes opposing third and fourth outer regions and a second middle region disposed therebetween,
the third and fourth outer regions having a first depth, and
the second middle region having a second depth that is greater than the first depth.

13. The modular balancing system of claim 12, wherein
the holding structure includes opposing third and fourth surfaces,
the third surface including third and fourth sloped portions,
the third sloped portion transitioning between the third outer region and the second middle region,
the fourth sloped portion transitioning between the fourth outer region and the second middle region,
the fourth surface configured to be disposed immediately adjacent to the vehicle, and
the fourth surface being substantially flat.

14. The modular balancing system of claim 13, wherein the fourth surface includes a channel configured to receive one or more wiring assemblies.

15. The modular balancing system of claim 14, wherein the channel extends along greater than or equal to about 70% of a total length of the holding structure.

16. The modular balancing system of claim 14, wherein the channel includes one or more openings in the holding structure that extend from the third surface to the fourth surface and aid placement of the one or more wiring assemblies.

17. The modular balancing system of claim 13, wherein
the holding structure includes opposing first and second ends,
the first end including a fifth sloped portion transitioning from the third surface towards the fourth surface; and
the second end including a sixth sloped portion transitioning from the third surface towards the fourth surface.

18. The modular balancing system of claim 17, wherein
the holding structure includes a first chamfered surface at or near the first end of the holding structure and a second chamfered surface at or near the second end of the holding structure,
the first chamfered surface at least partially extending along the third outer region and the fifth sloped portion, and
the second chamfered surface at least partially extending along the fourth outer region and the sixth sloped portion.

19. The modular balancing system of claim 1, wherein
the one or more modular weights includes a first modular weight and a second modular weight, and
the one or more cavities includes:
a first cavity configured to receive and hold the first modular weight, and
a second cavity configured to receive and hold the second modular weight.

20. A modular balancing system for a vehicle, the modular balancing system comprising:
one or more modular weights including one or more first holes;
a holding structure including one or more cavities configured to receive and hold the one or more modular weights, the holding structure including one or more second holes that correspond with the one or more first holes, that are configured to receive one or more first couplers for coupling the holding structure to the vehicle, and that extend through the one or more cavities; and a weight plate disposed between the holding structure and the vehicle, the weight plate including one or more third holes that correspond with the one or more first holes and the one or more second holes, the one or more first couplers configured to extend through the one or more first holes of the one or more modular weights, the one or more second holes of the holding structure, and the one or more third holds of the weight plate to couple the holding structure, the one or more modular weights, and the weight plate to the vehicle.

* * * * *